US011115184B2

(12) United States Patent
Minner et al.

(10) Patent No.: US 11,115,184 B2
(45) Date of Patent: Sep. 7, 2021

(54) FORMAT PRESERVING ENCRYPTION WITH PADDING

(71) Applicant: EntIT Software LLC, Sunnyvale, CA (US)

(72) Inventors: Richard Minner, Sunnyvale, CA (US); Terence Spies, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 202 days.

(21) Appl. No.: 15/601,548

(22) Filed: May 22, 2017

(65) Prior Publication Data

US 2018/0337768 A1     Nov. 22, 2018

(51) Int. Cl.
    *H04L 9/06*          (2006.01)
    *H04L 29/06*       (2006.01)

(52) U.S. Cl.
    CPC .......... *H04L 9/0618* (2013.01); *H04L 9/0643* (2013.01); *H04L 63/123* (2013.01); *H04L 63/0435* (2013.01)

(58) Field of Classification Search
    CPC ..... H04L 9/0618; H04L 9/002; H04L 9/0838; H04L 9/3006; H04L 63/0471
    USPC .......................................................... 380/28
    See application file for complete search history.

(56) References Cited

U.S. PATENT DOCUMENTS

| | | | |
|---|---|---|---|
| 5,799,090 A * | 8/1998 | Angert .................. | H04L 9/0662 380/262 |
| 2008/0219435 A1* | 9/2008 | Kodama ............... | H04L 9/0643 380/28 |
| 2011/0026712 A1* | 2/2011 | Ducharme ........... | H04L 9/0643 380/277 |
| 2011/0225173 A1* | 9/2011 | Gulhane .............. | G06K 9/3266 707/749 |
| 2011/0280394 A1* | 11/2011 | Hoover ................ | H04L 9/0625 380/28 |
| 2014/0013122 A1* | 1/2014 | Arnold ................ | G06F 21/6209 713/189 |
| 2014/0169555 A1* | 6/2014 | Yajima ................. | H04L 9/0618 380/28 |
| 2017/0033925 A1* | 2/2017 | DeNeut .................. | G06F 21/00 |
| 2017/0078251 A1* | 3/2017 | Grubbs ............. | G06F 17/30864 |
| 2018/0062987 A1* | 3/2018 | Badillo ............... | H04L 47/6245 |

FOREIGN PATENT DOCUMENTS

WO     WO-2018108274 A1 *    6/2018        H04L 9/0618

\* cited by examiner

*Primary Examiner* — Trong H Nguyen
*Assistant Examiner* — Moeen Khan

(57) ABSTRACT

Techniques for using padding in format preserving encryption are provided. In one aspect, it may be determined if padding of a plaintext undergoing format preserving encryption is needed. A pseudo random padding length may be calculated when it is determined that padding is needed. The calculated length of padding may be added to the plaintext when it is determined that padding is needed. The plaintext and added padding may be encrypted using format preserving encryption to create a cipher text.

20 Claims, 4 Drawing Sheets

FORMAT PRESERVING ENCRYPTION WITH PADDING

BACKGROUND

Format preserving encryption is a type of encryption in which the cipher text (i.e. the encrypted content) is in the same format as the plaintext (i.e. the unencrypted content). The term format may be easier to understand by way of example. For example, the plaintext of a credit card number may consist of 16 numeric digits. Utilizing format preserving encryption, the resulting cipher text may also contain 16 numeric digits, but those digits would be different than the original plaintext. As another example, a database may include a person's name. The plaintext would be a given number of alphabetic characters (e.g. "Smith"). The format preserving encryption cipher text would consist of the same number of alphabetic characters (e.g. "kQnal"). Again, the actual characters of the cipher text would be different than the plain text.

DETAILED DESCRIPTION

Figure 1:
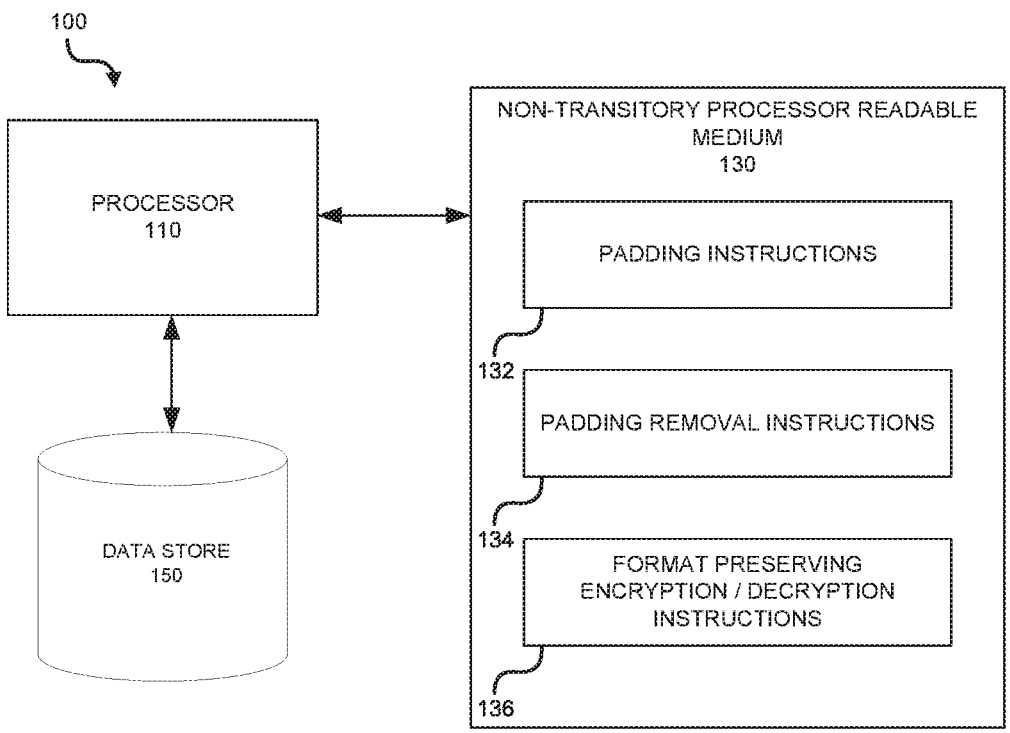
FIG. 1 depicts an example of a system that may utilize the format preserving encryption with padding techniques described herein.

Format preserving encryption is sometimes used when retrofitting systems that were not originally designed to utilize encryption. For example, consider a database that stores credit card numbers as a numeric field. In other words, the field can only store the digits 0-9. Any type of encryption that does not result in cipher text containing only digits would not be usable with a field that was so defined. Similarly, a field may be defined as only storing alphabetic characters (e.g. the letters A-Z). Such a field may, for example, be used to store data such as a person's name. Again, any type of encryption that does not result in cipher text containing only alphabetic characters would not be usable for an alphabetic field. By using format preserving encryption, it may be ensured that the cipher text that is generated is in the same form as the plaintext, and as such is capable of being stored.

Format preserving encryption is not without shortcomings. Because the format of the cipher text follows the format of the plaintext, certain information about the plain text is divulged. For example, consider a database that stores credit card numbers. If the plaintext is a 16 digit number representing a credit card number, the cipher text will also be a sixteen digit number. If an unscrupulous actor were able to gain access to the complete database, he would be able to see that each record in the database contains a field with 16 digits. From this information, the bad actor may be able to infer that because credit card numbers are typically 16 digits, that particular field in the database contains credit card numbers. From there, the attacker could focus on attempting to break the encryption on that particular field, instead of having to break the encryption on the entire record.

As yet another example, consider the case of a database that contains records which include a field for a person's last name. When utilizing format preserving encryption, the length of the cipher text would be the same as the length of the plaintext. For the majority of names, there would be no issue, as the length of the encrypted name generally reveals nothing as there would likely be many other names of the same length. However, at the edge cases, the length of the encrypted names could potentially reveal the unencrypted names. For example, consider extremely short last names, such as the name Wu. Here, the encrypted name would still be only 2 characters long. Consider a database that only contains one person with a 2 character last name. It is clear that this record would belong to the person whose last name is Wu, because no other person's encrypted name could generate a 2 character cipher text.

The techniques described herein overcome these and other shortcomings of format preserving encryption. A plaintext may be examined to determine if the length of the plaintext is below a threshold. If so, an effectively random length of desired padding is determined, A sequence of characters having a length equal to the desired length of padding is added to the plain text. The sequence of characters is such that it can be later identified. The plaintext with added padding characters may then be encrypted with any form of format preserving encryption. Because of the added padding, a bad actor who is able to access the cipher text may not be able to infer any information about the type of data contained in the cipher text, because the length of the cipher text is no longer associated with the length of the plaintext.

When it is desired to decrypt the cipher text, the decryption algorithm associated with the format preserving encryption used to encrypt the plaintext is executed to recover the original plaintext with the added padding. Because the sequence of characters that was added to the plaintext is identifiable, the added padding characters can be removed, thus resulting in the original plaintext. These techniques are described in further detail below and in conjunction with the appended figures.

FIG. 1 depicts an example of a system that may utilize the format preserving encryption with padding techniques described herein. System 100 may include a processor 110, a non-transitory processor readable medium 130 containing processor executable instructions thereon, and a data store 150. The processor may be any type of device that is capable of executing instructions in order to implement the techniques described herein. For example, the processor may be a central processing unit (CPU), a graphics processing unit (GPU), an application specific integrated circuit (ASIC) or any other device capable of executing instructions stored on a processor readable medium.

The non-transitory processor readable medium 130 may include a set of processor executable instructions thereon. These instructions may be executed by the processor to implement the techniques described herein. For example, the medium may include padding instructions 132 to add padding to the plaintext of a data item that is to be encrypted. The operation of padding instructions 132 are described below and in the flow diagrams depicted in FIGS. 2-4.

The non-transitory medium 130 may also include padding removal instructions 134. The operation of the padding removal instructions are described below and in the flow diagram depicted in FIG. 5, The non-transitory medium may also include format preserving encryption/decryption instructions 136. The techniques described herein are not dependent on any particular type of format preserving encryption (FPE) algorithm. For purposes of the reminder of this description FPE will refer to any form of format preserving encryption/decryption that is readily available.

The system 100 may also include a data store 150. The particular form of the data store is relatively unimportant. For example, the data store may be a database. The data store may be a relational database, and object database, a key-value store, or any other mechanism for data storage. What should be understood is that any device capable of storing data that has been encrypted using the FPE with padding techniques described herein is suitable for use with system 100.

Furthermore, it should be understood that the example implementation of system 100 as processor based is just an example. The techniques described herein are not limited to processor based systems that execute instructions. The techniques described herein are equally applicable to systems created using discrete logic and hard coded circuitry. For example, the logic may be embodied in the form of an application specific integrated circuit (ASIC), as a field programmable gate array (FPGA), a programmable logic device (PLD), or any other form of logic circuitry.

In operation, a data element that is to utilize the FPE with padding techniques may be received. For example, consider the case where the data element is a person's last name. For purposes of description, assume the last name received is "Smith" 160, as shown in the FIG. 1. Before continuing with the description, several definitions will be set forth.

P=plaintext to pad and encrypt.

A=the minimum plaintext string length. Any plaintext having a length shorter than this length will be padded. For this example, assume the minimum plaintext length is 15 characters. However, it should be understood that this assumption is merely for purposes of explanation and should not be considered limiting. Any minimum length could be selected.

B=the minimum number of padding characters to add when padding. It may be desirable to always add a certain number of padding characters. For example, given the example name "Wu" described above. It would be possible for the random selection of the number of padding characters to result in 0. As such, there would be no padding added, which would then result in the situation where the length of the cipher text could allow one to infer information about the plaintext. For this example, assume the minimum number of padding characters to add is 5.

Y=the calculated number of padding characters to add.

M=the maximum acceptable length of cipher text. This number may be determined by the maximum length of data that can be stored. For example, a database may limit the length of a text field to some certain number of characters, such as 255. For purposes of this description, assume the maximum length of cipher text is 255. However, it should be understood that this is for purpose of description and not by way of limitation. The actual maximum length of cipher text may be implementation specific.

I=an identifiable character/sequence of characters that cannot appear in any valid plaintext in determinable places. In a simple form, certain characters cannot appear in valid plaintext. For example, an alphabetic character cannot belong in a valid plaintext that contains a credit card number, because it is not possible for a credit card number to contain letters. In other cases, what is considered valid plaintext may be position dependent. For example, a credit card number cannot being with the digit 0. Thus, if a credit card number is padded with leading zeros, then it can be determined that all characters until the first non-zero character are padding. In some cases, padding may be added in the middle of a valid plaintext. For example, consider a plaintext that is a person's name, which cannot include special characters in the middle. Thus, if a plaintext includes a sequence of special characters in the middle (or anywhere else for that matter) it may be determined that this is not a valid sequence of characters to be included in the plain text at the determinable location. As such, the characters must be padding. What should be understood is that the techniques described herein are dependent on the ability to recognize characters that do not belong in valid plaintext, regardless of how that determination is made. Any sequence of characters that can be determined to not be part of valid plain text at determinable locations may be utilized.

C=the cipher text produced.

The first step of the process may be to determine if padding is needed at all. If the length of P is greater than A, then no padding is needed. The value of Y may be set to zero, because no padding will be added. If P is less than A, then padding will be added. In this example, the length of "Smith" is 5 characters, which is less than the minimum acceptable length A, which is 15. As such, padding characters will be added.

Assuming that padding is required, the next step is to determine the length of that padding. First, the maximum amount of padding that can be added (maxPad) may be determined by subtracting the length of the plaintext P from the maximum length of cipher text M. In this case M=255 and P=5, so maxPad=M P=250. Thus it is not possible to add more than maxPad characters, because to do so would result in the resulting cipher text being longer than the maximum allowable length of cipher text.

The next step would be to determine Y, the number of padding characters to be added. In one implementation, the number of padding characters to be added may be determined by the formula Y=B+(MAC(P) modulo (maxPad-B) 161 as shown in FIG. 1. In the present example, B=5 and maxPad=5 as shown at element 162 in FIG. 1.

MAC(P) may be a message authentication code (MAC) that is generated based on the plaintext P. There are many available forms of MAC and any one would be suitable. The general characteristics of a suitable MAC would be one for which a given plaintext produces a numeric value that is quite large. Furthermore, given the MAC it should not be possible to recover the plaintext. Although in this example, a MAC is described as the function for generating a large, somewhat random number, and other suitable technique may be used. In the present example, the number representing the MAC 162 (14856703987693) was actually just a randomly selected large number. Some implementations may use a randomly selected large number rather than a MAC. What should be understood is that the techniques described herein are not dependent on the specific function used to generate a large number.

The modulo operation of the MAC and (maxPad-B) results in the remainder of an integer division of the MAC by the maximum number of padding characters that can be added. This is effectively selecting a random number of padding characters to add, where the range that can be selected form is between B and maxPad. As shown, in the present example Y 163 is calculated to be 13.

Once the number of padding characters to add has been determined, that number of characters can be added to the plaintext P. In one implementation, the characters to be added may have the characteristic that such a character could never appear in valid plaintext. For example, in a name field the special character "#" is not a valid character, as it is not a valid character in a name. As shown in line 164, Y instances (e.g. 13) of the invalid character "#" may be added to the plaintext.

Although the example presented has shown multiple instances of a single invalid character prepended to the plaintext, the techniques described herein are not so limited. For example, instead of using a single invalid character, a sequence may consist of many different invalid characters. For example, if all special characters are invalid, then a random selection of special characters (e.g. "#%*&^* (&*—") may be used as padding. Also, although the example presented showed the padding characters added at the beginning of the plaintext, in other implementations, the padding may be added at the end, or possible even in the middle of the plaintext.

In yet other implantations the padding may be a sequence of characters that is identifiable by one or two sentinel sequences of characters. For example, the padding sequence could be an invalid character for the data type (e.g. "#") followed by any unrestricted set of characters, then followed by another invalid character (e.g. "#djfguhekdh#). In such an implementation, the system may be able to recognize everything after an invalid character is padding until another invalid character is reached, at which point the remaining characters are valid plaintext.

What should be understood is that a sequence of characters that is identifiable as padding characters is added to the plaintext. As will be explained in more detail below, the ability to identify the padding characters results in the ability to recover the original plaintext. Any technique to generate a later identifiable sequence of padding characters would be suitable for use with the techniques described herein.

Once the padding has been added to the plaintext, the plaintext with added padding can be encrypted using any form of FPE. The techniques described herein are not limited to any specific type of FPE. The result of the FPE will be C, cipher text 165. As can be seen, there is no information about the plaintext that can be inferred from the length of the cipher text, as the length of the cipher text does not directly equal the length of the plaintext.

When it is desired to decrypt the plaintext, the first step may be decrypt the cipher text C using the decryption techniques of the FPE that was used to encrypt the padded plaintext. As would be expected, the decrypted cipher text 166 is the same as the padded plaintext 164.

At this point, the identifiable sequence of characters can be removed. In this particular example, the character "#" is not a valid character for a name filed. This all instances of "#" are removed, After this removal the original plaintext "Smith" 167 is retrieved. As such, the plaintext is now back to its original form.

Figure 2:
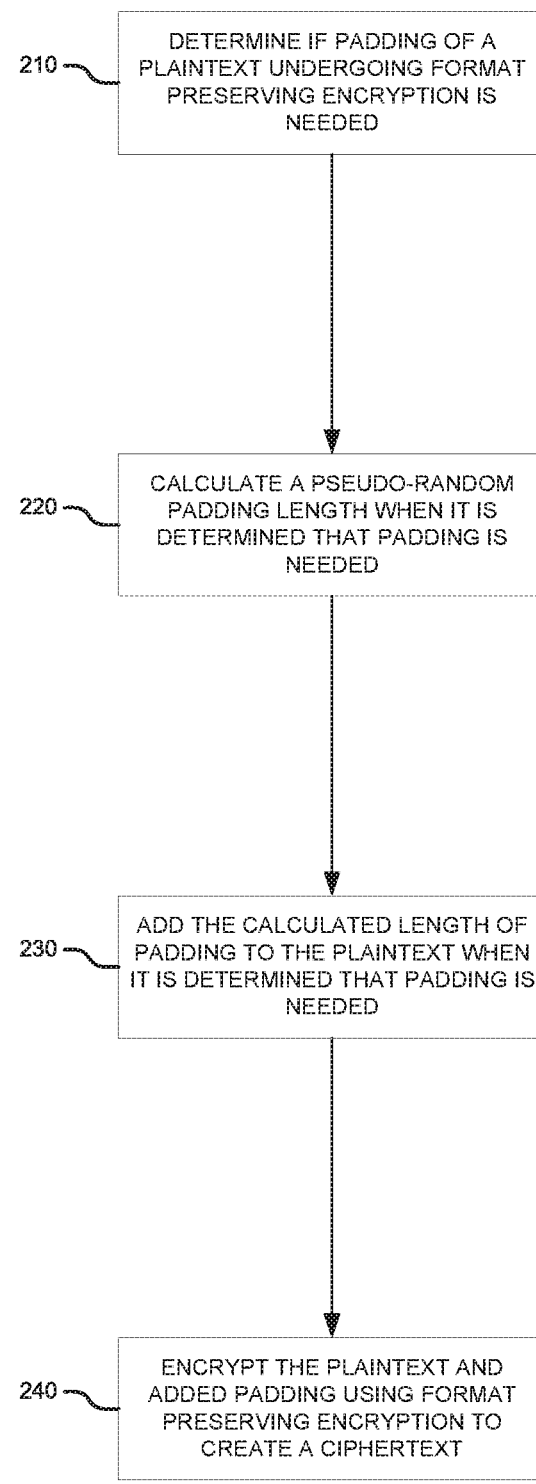
FIG. 2 depicts an example of a high level flow diagram for performing format preserving encryption with padding according to techniques described herein.

FIG. 2 depicts an example of a high level flow diagram for performing format preserving encryption with padding according to techniques described herein. In block 210 it may be determined if padding of a plaintext undergoing format preserving encryption is needed. As described above, a minimum length of a plaintext to be encrypted may be defined. If a particular plaintext has a length that is shorter than the minimum allowable length, the plaintext may be padded.

In block 220, a pseudo random padding length may be calculated when it is determined that padding is needed. The techniques described herein are not limited to any particular mechanism for calculating the length of the padding, but rather any mechanism that produces a random length can be used. In block 230, the length of padding that was calculated may be added to the plaintext when it is determined that padding is needed. As explained above, padding is not always added to the plaintext, but rather is only added when the plaintext is less than a threshold length.

In block 240, the plaintext and added padding may be encrypted using format preserving encryption to create a cipher text. The cipher text may have the same length as the plaintext plus padding due to the nature of format preserving encryption. However, no information about the unpadded plaintext is revealed because it cannot be determined if the cipher text was created based on padded or unpadded plaintext.

Figure 3:
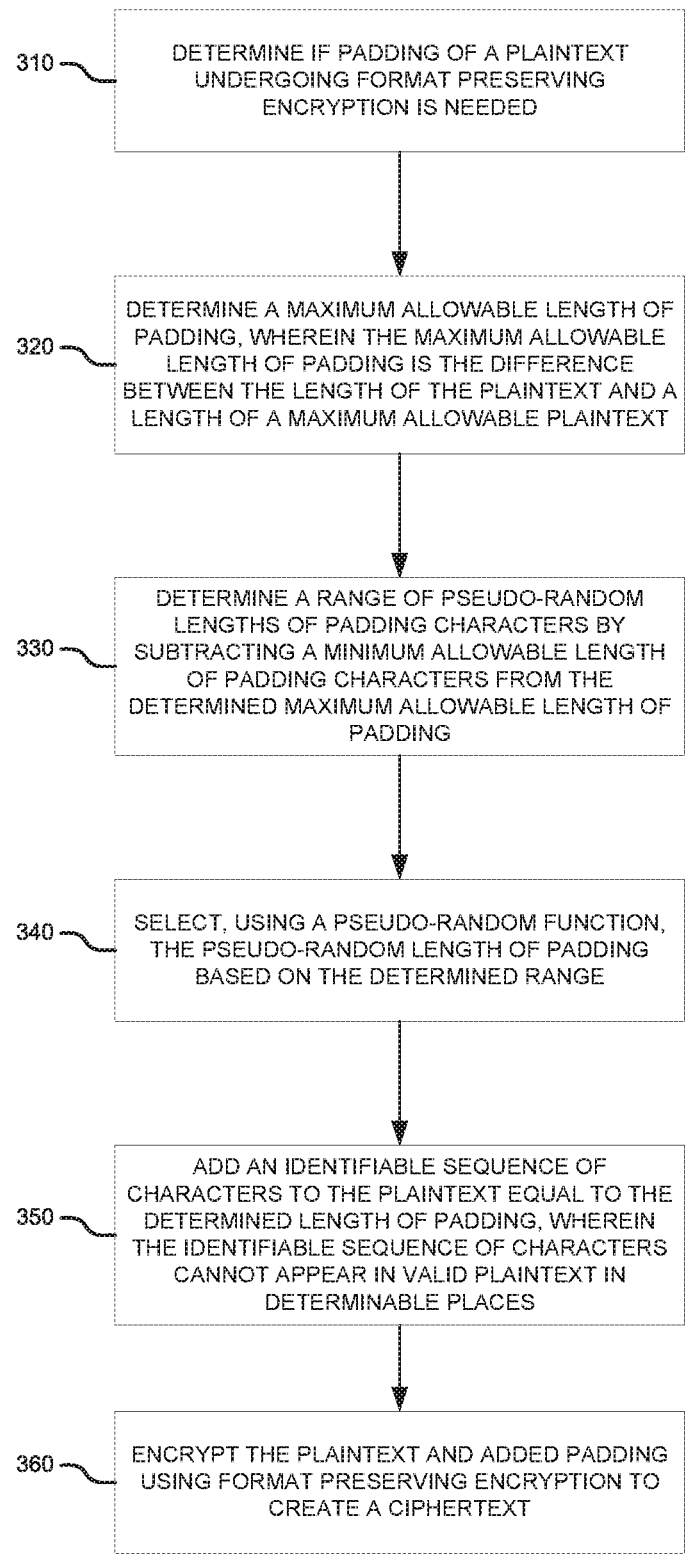
FIG. 3 depicts another example of a high level flow diagram for performing format preserving encryption with padding according to techniques described herein.

FIG. 3 depicts another example of a high level flow diagram for performing format preserving encryption with padding according to techniques described herein. Block 310 is essentially equivalent of block 210 described above in that it may be determined if padding of a plaintext undergoing format preserving encryption is needed.

In block 320, a maximum allowable length of padding may be determined. The maximum allowable length of padding may be the difference between the length of the plaintext and a length of a maximum allowable plaintext. In other words, due to the nature of data storage systems, a field may have a maximum allowable length. For example, a name field may have a maximum allowable length of 255 characters. By subtracting the length of the unpadded plaintext form the maximum allowable length, and setting that as the maximum allowable plaintext length, it can be ensured that the combined plaintext and padding does not exceed the maximum allowable length.

In block 330 a range of pseudo-random lengths of padding characters may be determined. The range may be determined by subtracting a minimum allowable length of padding characters from the maximum allowable length of padding that was determined above. In other words, the range of allowable lengths of padding is set to a range that covers the minimum amount of padding that may be added through the maximum length of padding characters that may be added. The only limit on the minimum allowable length of padding is that it cannot be greater than the maximum allowable length of padding.

In block 340 a pseudo-random length of padding may be selected using a pseudo-random function based on the determined range. In other words, once the range of possible lengths of padding has been determined, a specific length of padding selected from that range is selected. The techniques described herein are not limited to any particular form of pseudo random function. What should be understood is that the length of padding that is added is random, thus ensuring that no information can be inferred from the format preserving encrypted cipher text based on the length of that cipher text.

In block 350 an identifiable sequence of characters equal to the determined length of padding may be added to the plaintext. The identifiable sequence of characters may be such that it cannot exist in valid plaintext in a determinable place. For example, a numeric digit, or sequence of digits, may not be valid in the plaintext of a field containing a name because numbers are generally not allowed in name fields. Likewise, a special character (e.g. !, #, &) may also be an invalid character in valid plaintext for a field. It should be understood that the specific form of the sequence of characters is relatively unimportant. Any sequence of characters that is identifiable as not belonging to valid plaintext in a determinable place is suitable.

in block 360, just as in block 240 above, the plaintext and added padding may be encrypted using format preserving encryption to create cipher text. As above, because of the possibility of adding padding to the plaintext, no information can be inferred from the length of the cipher text.

Figure 4:
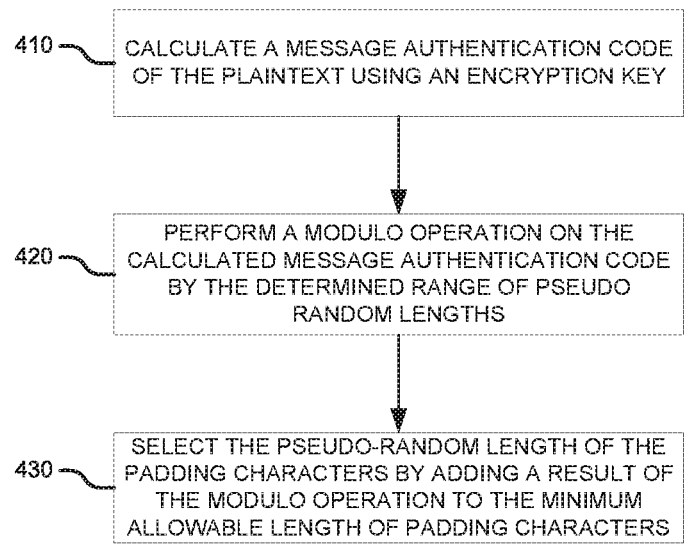
FIG. 4 depicts an example of a high level flow diagram for determining how much padding to add when performing format preserving encryption with padding according to techniques described herein.

FIG. 4 depicts an example of a high level flow diagram for determining how much padding to add when performing format preserving encryption with padding according to techniques described herein. In block 410 a message authentication code (MAC) of the plaintext may be calculated using an encryption key. The particular form of the MAC is relatively unimportant, and any available MAC is suitable for use in the techniques described herein. What should be understood is that the MAC produces a number that is based on the particular plaintext and the encryption key. This is generally a very large number and given the number, it is not possible to retrieve the original plaintext.

In block 420, a modulo operation may be performed on the calculated message authentication code by the determined range of pseudo random lengths. In other words, the result of the modulo operation is the remainder of an integer division of the MAC by the top of the range of allowable padding lengths. Given the nature of the MAC, this remainder will generally be a random length, within the allowable range, of padding characters.

In block 430, the length of the pseudo-random length of characters may be selected by adding the result of the modulo operation to the minimum allowable length of padding characters. As explained above, there may be a minimum allowable length of added padding characters. Because the result of the modulo operation may be zero, adding the result to the minimum allowable length ensures that at least the minimal length of padding characters will be added. Although a specific technique for selecting the length of padding characters based on a MAC has been described, it should be understood that any technique for pseudo-randomly selecting a length of padding would be acceptable.

Figure 5:
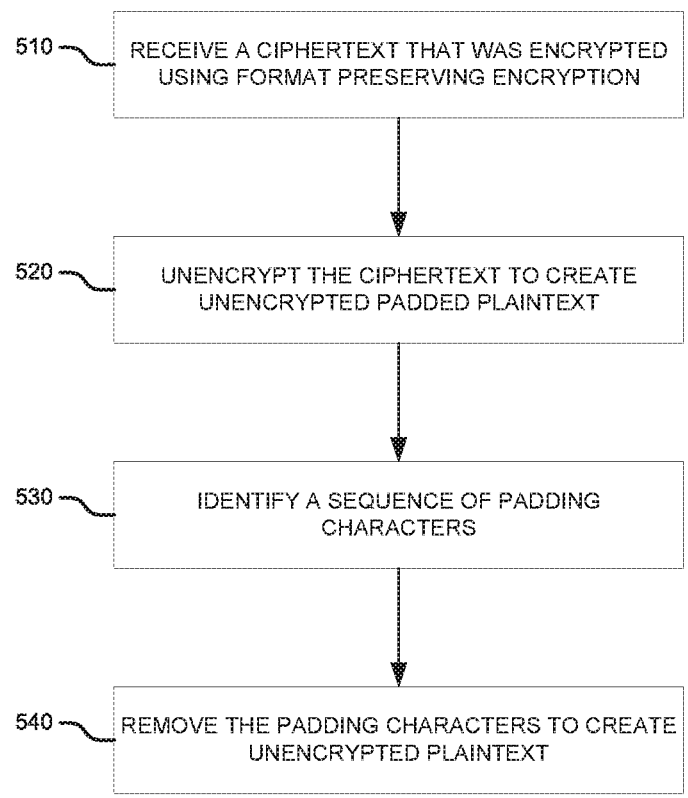
FIG. 5 depicts an example of a high level flow diagram for decrypting a data element that has been encrypted with format preserving encryption with padding according to the techniques described herein.

FIG. 5 depicts an example of a high level flow diagram for decrypting a data element that has been encrypted with format preserving encryption with padding according to the techniques described herein. In block 510, a cipher text may be received that was encrypted using format preserving encryption. In block 520, the cipher text may be unencrypted to create unencrypted padded plaintext. It should be noted that the techniques described herein are suitable with any form of format preserving encryption. The techniques described herein are not limited to any particular form of format preserving encryption.

In block 540, the padding characters may be removed to create unencrypted plaintext. As explained above, the padding characters that are added are an identifiable sequence of characters that cannot appear in valid plaintext in determinable places. Because these characters cannot appear in valid plaintext in determinable places, it is possible to determine which characters do not belong, and as such can only be padding characters. Removal of the padding characters becomes a simple matter of removing characters that cannot appear in the plaintext in determinable places which then results in the original, unpadded plaintext.

We claim:

1. A method comprising:
   determining if padding of a plaintext undergoing format preserving encryption is needed in response to a length of the plaintext being less than a threshold length;
   in response to determining that the padding is needed, calculating a pseudo-random padding length based on a nonzero minimum padding length and a maximum allowable length of padding and adding the padding having the pseudo-random padding length to the plaintext to provide a padded plaintext, wherein the adding comprises:
      including in the padding, a first character having an invalid data type for the padded plaintext and corresponding to a beginning of the padding and a second character having an invalid data type for the padded plaintext and corresponding to an end of the padding,
      wherein the first and second characters are provided for each padded plaintext; and
   in response to determining that the padding is needed, encrypting the padded plaintext using format preserving encryption to create cipher text.

2. The method of claim 1, wherein calculating the pseudo-random padding length further comprises:
   determining the maximum allowable length of padding by taking a difference between the length of the plaintext and a maximum length of the cipher text;
   determining a range of pseudo-random lengths of padding characters by subtracting the nonzero minimum padding length from the maximum allowable length of padding; and
   selecting, using a pseudo-random function, the pseudo-random padding length based on the range of pseudo-random lengths of padding characters.

3. The method of claim 2, wherein selecting, using the pseudo-random function, the pseudo-random padding length further comprises:
   calculating a message authentication code of the plaintext using an encryption key;
   performing a modulo operation on the message authentication code by the range of pseudo-random lengths of padding characters; and
   selecting the pseudo-random padding length by adding a result of the modulo operation to the nonzero minimum padding length.

4. The method of claim 1, wherein the first character has a corresponding position in the padded plaintext and the first character has the invalid data type due to the position.

5. The method of claim 1, wherein characters provided between the first character and the second character of the padding include valid data types for the padded plaintext.

6. The method of claim 1, wherein the adding further comprises adding the padding before a beginning of the plaintext to produce the padded plaintext.

7. The method of claim 1, wherein the adding further comprises including a first sentinel sequence of characters that include the first character and a second sentinel sequence of characters that include the second character, wherein each character of the first sentinel sequence of characters has an invalid data type for the padded plaintext, and each character of the second sentinel sequence of characters has an invalid data type for the padded plaintext.

8. A non-transitory processor readable medium containing a set of instructions thereon that, when executed by a processor, cause the processor to:

determine if padding of a plaintext undergoing format preserving encryption is needed in response to a length of the plaintext being less than a threshold length;

in response to determining that the padding is needed, calculate a pseudo-random padding length based on a nonzero minimum padding length and a maximum allowable length of padding and add the padding having the pseudo-random padding length to the plaintext to provide a padded plaintext, wherein adding the padding comprises:

include in the padding a first character having an invalid data type for the padded plaintext and corresponding to a beginning of the padding and a second character having an invalid data type for the padded plaintext and corresponding to an end of the padding, wherein the first and second characters are provided for each padded plaintext;

and in response to determining that the padding is needed, encrypt the padded plaintext using format preserving encryption to create cipher text.

9. The medium of claim 8, wherein the instructions, when executed by the processor, further cause the processor to:

determine the maximum allowable length for the padding by taking a difference between a length of the plaintext and a maximum length of the cipher text;

determine a range of pseudo-random lengths of padding characters by subtracting the nonzero minimum padding length from the maximum allowable length; and select, using a pseudo-random function, the pseudo-random padding length based on the range of pseudo-random lengths of padding characters.

10. The medium of claim 9, wherein the instructions, when executed by the processor, further cause the processor to:

calculate a message authentication code of the plaintext using an encryption key;

perform a modulo operation on the message authentication code based on the range; and select the pseudo-random padding length by adding a result of the modulo operation to the nonzero minimum padding length.

11. The medium of claim 8, wherein the first character has a corresponding position in the padded plaintext and the first character has the invalid data type due to the position.

12. The medium of claim 8, wherein characters provided between the first character and the second character of the padding include valid data types for the padded plaintext.

13. The medium of claim 8, wherein the instructions, when executed by the processor, further cause the processor to:

add the padding before a beginning of the plaintext to produce the padded plaintext.

14. The medium of claim 11, wherein the instructions, when executed by the processor, further cause the processor to:

include a first sentinel sequence of characters that include the first character and a second sentinel sequence of characters that include the second character, wherein each character of the first sentinel sequence of characters has an invalid data type for the padded plaintext, and each character of the second sentinel sequence of characters has an invalid data type for the padded plaintext.

15. The medium of claim 8, wherein the instructions, when executed by the processor, further cause the processor to:

receive the cipher text;

unencrypt the cipher text to create unencrypted padded plaintext;

identify padding characters in the unencrypted padded plaintext; and remove the padding characters to create unencrypted plaintext.

16. The medium of claim 15, wherein the instructions, when executed by the processor, further cause the processor to identify the padding characters in response to identifying the first character and identifying the second character.

17. The medium of claim 15, wherein the instructions, when executed by the processor, further cause the processor to identify the second character based on a position of the second character in the padded plaintext and the second character having the invalid data type for the position.

18. The method of claim 1, further comprising calculating the pseudo-random padding length based on the plaintext.

19. A system comprising:

a processor;

and a memory to store instructions that, when executed by the processor, cause the processor to:

determine if padding of a plaintext undergoing format preserving encryption is needed in response to a length of the plaintext being less than a threshold length;

in response to determining that the padding is needed, calculate a pseudo-random padding length based on a nonzero minimum padding length and a maximum allowable length of padding and add the padding having the pseudo-random padding length to the plaintext to provide a padded plaintext, wherein adding the padding comprises:

include in the padding a first character having an invalid data type for the padded plaintext and corresponding to a beginning of the padding and a second character having an invalid data type for the padded plaintext and corresponding to an end of the padding, wherein the first and second characters are provided for each padded plaintext;

and in response to determining that the padding is needed, encrypt the padded plaintext using format preserving encryption to create cipher text.

20. The system of claim 19, wherein the instructions, when executed by the processor, further cause the processor to:

determine the maximum allowable length of padding by taking a difference between a length of the plaintext and a maximum length of the cipher text;

determine a range of pseudo-random lengths of padding characters by subtracting the nonzero minimum padding length from the maximum allowable length of padding; and select, using a pseudo-random function, the pseudo-random padding length based on the range.

* * * * *